(12) United States Patent
Tang et al.

(10) Patent No.: US 7,531,161 B2
(45) Date of Patent: May 12, 2009

(54) BOEHMITE AND POLYMER MATERIALS INCORPORATING SAME

(75) Inventors: Hui Tang, Worcester, MA (US); Christopher L. Mirley, Winthrop, MA (US); Ralph Bauer, Niagara Falls (CA)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 11/685,000

(22) Filed: Mar. 12, 2007

(65) Prior Publication Data

US 2007/0148083 A1    Jun. 28, 2007

Related U.S. Application Data

(63) Continuation of application No. 10/414,590, filed on Apr. 16, 2003, now Pat. No. 7,189,775.

(60) Provisional application No. 60/374,014, filed on Apr. 19, 2002.

(51) Int. Cl.
    *C01F 7/04*    (2006.01)
(52) U.S. Cl. .......................... 423/625; 423/111; 117/6
(58) Field of Classification Search ...................... 117/6, 117/9; 423/111, 625
    See application file for complete search history.

(56) References Cited

U.S. PATENT DOCUMENTS

| | | | |
|---|---|---|---|
| 2,763,620 A | 9/1956 | Bugosh | |
| 2,915,475 A | 12/1959 | Bugosh | |
| 3,108,888 A | 10/1963 | Bugosh | |
| 3,321,272 A | 5/1967 | Kerr | |
| 3,357,791 A | 12/1967 | Napier | |
| 3,385,663 A | 5/1968 | Hughes | |
| 3,387,447 A | 6/1968 | Trammell et al. | |
| 3,814,782 A | 6/1974 | Hayes et al. | |
| 3,842,111 A | 10/1974 | Meyer-Simon et al. | |
| 3,853,688 A | 12/1974 | D'Ambrosio | |
| 3,865,917 A | 2/1975 | Galasso et al. | |
| 3,873,489 A | 3/1975 | Thurn et al. | |
| 3,950,180 A | 4/1976 | Kato | |
| 3,978,103 A | 8/1976 | Meyer-Simon et al. | |
| 3,997,581 A | 12/1976 | Pletka et al. | |
| 4,002,594 A | 1/1977 | Fetterman | |
| 4,105,465 A | 8/1978 | Berger | |
| 4,117,105 A | 9/1978 | Hertzengerg et al. | |
| 4,120,943 A | 10/1978 | Iwaisako et al. | |
| 4,344,928 A | 8/1982 | Dupin et al. | |
| 4,377,418 A | 3/1983 | Birchall et al. | |
| 4,386,185 A | 5/1983 | Macdonell et al. | |
| 4,492,682 A | 1/1985 | Trebillon | |
| 4,525,494 A | 6/1985 | Andy | |
| 4,539,365 A | 9/1985 | Rhee | |
| 4,558,102 A | 12/1985 | Miyata | |
| 4,623,738 A | 11/1986 | Sugerman et al. | |
| 4,632,364 A | 12/1986 | Smith | |
| 4,716,029 A * | 12/1987 | Oguri et al. ................. 423/625 |
| 4,769,179 A | 9/1988 | Kato et al. | |
| 4,797,139 A | 1/1989 | Bauer | |
| 4,891,127 A | 1/1990 | Dispenzier | |
| 4,946,666 A | 8/1990 | Brown | |
| 4,992,199 A | 2/1991 | Meyer et al. | |
| 5,155,085 A | 10/1992 | Hamano et al. | |
| 5,194,243 A | 3/1993 | Pearson et al. | |
| 5,286,290 A | 2/1994 | Risley | |
| 5,302,368 A | 4/1994 | Harato et al. | |
| 5,306,680 A | 4/1994 | Fukuda | |
| 5,318,628 A | 6/1994 | Matijevic et al. | |
| 5,321,055 A | 6/1994 | Slocum | |
| 5,332,777 A | 7/1994 | Goetz et al. | |
| 5,344,489 A | 9/1994 | Matijevic et al. | |
| 5,401,703 A | 3/1995 | Fukuda | |
| 5,413,985 A | 5/1995 | Thome et al. | |
| 5,445,807 A * | 8/1995 | Pearson ...................... 423/625 |
| 5,508,016 A | 4/1996 | Yamanishi et al. | |
| 5,527,851 A | 6/1996 | Barron et al. | |
| 5,550,180 A | 8/1996 | Elsik et al. | |
| 5,580,914 A | 12/1996 | Falla et al. | |
| 5,580,919 A | 12/1996 | Agostini et al. | |
| 5,583,245 A | 12/1996 | Parker et al. | |
| 5,663,396 A | 9/1997 | Musleve et al. | |
| 5,684,171 A | 11/1997 | Wideman et al. | |
| 5,684,172 A | 11/1997 | Wideman et al. | |

(Continued)

FOREIGN PATENT DOCUMENTS

CN    1237146 A    12/1999

(Continued)

OTHER PUBLICATIONS

Zhang, L. et al., "Preparation and Characterization of Nano-fibrous g-Al2O3," Shiyou Huagong, vol. 33, No. 3, pp. 240-243, 2004. Abstract Only.

(Continued)

*Primary Examiner*—Tae H Yoon
(74) *Attorney, Agent, or Firm*—Larson Newman Abel Polansky & White, LLP; Joseph P. Sullivan (57) ABSTRACT

A modified polymer material is discloses, including a polymer base and boehmite particles provided in the polymer base, the boehmite particles are made up of mainly anisotropically shaped particles.

17 Claims, 7 Drawing Sheets

U.S. PATENT DOCUMENTS

| | | |
|---|---|---|
| 5,696,197 A | 12/1997 | Smith et al. |
| 5,707,716 A | 1/1998 | Yoshino et al. |
| 5,723,529 A | 3/1998 | Bernard et al. |
| 5,849,827 A | 12/1998 | Boediger et al. |
| 5,900,449 A | 5/1999 | Custodero et al. |
| 5,955,142 A | 9/1999 | Yoshino et al. |
| 5,962,124 A | 10/1999 | Yoshino et al. |
| 5,989,515 A | 11/1999 | Watanabe et al. |
| 6,017,632 A | 1/2000 | Pinnavaia et al. |
| 6,143,816 A | 11/2000 | Prescher et al. |
| 6,156,835 A | 12/2000 | Anderson et al. |
| 6,203,695 B1 | 3/2001 | Harle et al. |
| 6,403,007 B1 | 6/2002 | Kido et al. |
| 6,413,308 B1 | 7/2002 | Xu et al. |
| 6,417,286 B1 | 7/2002 | Agostini et al. |
| 6,440,187 B1 | 8/2002 | Kasai et al. |
| 6,440,552 B1 | 8/2002 | Kajihara et al. |
| 6,485,656 B1 | 11/2002 | Meyer et al. |
| 6,486,254 B1 | 11/2002 | Barbee et al. |
| 6,534,584 B2 | 3/2003 | Wideman et al. |
| 6,576,324 B2 | 6/2003 | Yoshino et al. |
| 6,610,261 B1 | 8/2003 | Custodero et al. |
| 6,635,700 B2 | 10/2003 | Cruse et al. |
| 6,646,026 B2 | 11/2003 | Fan et al. |
| 6,648,959 B1 | 11/2003 | Fischer et al. |
| 6,653,387 B2 | 11/2003 | Causa et al. |
| 6,689,432 B2 | 2/2004 | Kitamura et al. |
| 6,706,660 B2 | 3/2004 | Park |
| 6,747,087 B2 | 6/2004 | Custodero et al. |
| 6,841,207 B2 | 1/2005 | Burch et al. |
| 6,858,665 B2 | 2/2005 | Larson |
| 6,872,444 B2 | 3/2005 | McDonald et al. |
| 6,924,011 B2 | 8/2005 | Van Aert et al. |
| 7,056,585 B2 | 6/2006 | Mishima et al. |
| 7,189,775 B2 | 3/2007 | Tang et al. |
| 7,211,612 B2 | 5/2007 | Kikuchi |
| 7,226,647 B2 | 6/2007 | Kasperchik et al. |
| 2002/0004549 A1 | 1/2002 | Custodero et al. |
| 2002/0169243 A1 | 11/2002 | Nippa |
| 2003/0197300 A1 | 10/2003 | Hui et al. |
| 2003/0202923 A1 | 10/2003 | Custodero et al. |
| 2004/0030017 A1 | 2/2004 | Simonot et al. |
| 2004/0120904 A1 | 6/2004 | Lye et al. |
| 2004/0265219 A1 | 12/2004 | Bauer et al. |
| 2005/0124745 A1 | 6/2005 | Bauer et al. |
| 2005/0227000 A1 | 10/2005 | Bauer et al. |
| 2005/0267238 A1 | 12/2005 | Mutin |
| 2006/0104895 A1 | 5/2006 | Bauer et al. |
| 2006/0106129 A1 | 5/2006 | Gernon et al. |
| 2006/0148955 A1 | 7/2006 | Guiselin et al. |
| 2007/0104952 A1 | 5/2007 | Bianchi et al. |
| 2008/0031808 A1* | 2/2008 | Bauer et al. ................. 423/625 |

FOREIGN PATENT DOCUMENTS

| | | |
|---|---|---|
| CN | 1266020 A | 9/2000 |
| CS | 195426 | 5/1982 |
| DE | 956535 | 1/1957 |
| DE | 2163678 | 7/1973 |
| DE | 2408122 | 8/1974 |
| DE | 2952666 | 7/1980 |
| EP | 0 038 620 A2 | 10/1981 |
| EP | 0 015 196 | 4/1982 |
| EP | 0 108 968 A1 | 5/1984 |
| EP | 0 304 721 A1 | 3/1989 |
| EP | 0 563 653 A1 | 10/1993 |
| EP | 0 667 405 A1 | 8/1995 |
| EP | 0 501 227 B1 | 12/1995 |
| EP | 0 735 001 A2 | 10/1996 |
| EP | 0 885 844 A1 | 12/1998 |
| EP | 0 896 021 A1 | 2/1999 |
| EP | 1 225 200 A2 | 7/2002 |
| EP | 1 256 599 A1 | 11/2002 |
| EP | 1 323 755 A1 | 7/2003 |
| EP | 0 697 432 B1 | 10/2003 |
| EP | 1 000 965 B1 | 10/2003 |
| EP | 0 807 603 B1 | 12/2003 |
| EP | 1 112 961 B1 | 9/2004 |
| EP | 0736392 A1 | 10/2006 |
| GB | 1189304 | 4/1970 |
| GB | 2248841 | 4/1992 |
| HU | 26758 T | 9/1983 |
| JP | 45-032530 | 10/1970 |
| JP | 55-116622 A | 9/1980 |
| JP | 56-009427 A | 1/1981 |
| JP | 58-026029 A2 | 2/1983 |
| JP | 58-185434 A | 10/1983 |
| JP | 59-193949 | 11/1984 |
| JP | 63-147820 A2 | 6/1988 |
| JP | 63-147821 A2 | 6/1988 |
| JP | 05-279019 | 10/1993 |
| JP | 63-22243 | 11/1994 |
| JP | 7-18174 | 1/1995 |
| JP | 09-208809 | 8/1997 |
| JP | 9-511258 | 11/1997 |
| JP | 2000-239014 | 9/2000 |
| JP | 2001-058818 A | 3/2001 |
| JP | 2001-180930 | 7/2001 |
| JP | 2001/207077 | 7/2001 |
| JP | 2001-261976 | 9/2001 |
| JP | 2003-002642 | 1/2003 |
| JP | 2003-054941 | 2/2003 |
| JP | 2003-107206 | 4/2003 |
| JP | 2003-238150 | 8/2003 |
| JP | 2004-051390 A2 | 2/2004 |
| JP | 2004-59643 A | 2/2004 |
| SU | 267064 A | 7/1970 |
| WO | WO 95/11270 | 4/1995 |
| WO | WO 97/23566 | 7/1997 |
| WO | WO 98/14426 | 4/1998 |
| WO | 99/35089 A1 | 7/1999 |
| WO | WO 03/089508 A1 | 10/2003 |
| WO | WO 2004/016630 A1 | 2/2004 |
| WO | WO 2004/056915 A1 | 7/2004 |
| WO | WO 2004/090023 A1 | 10/2004 |
| WO | WO 2005/100244 A2 | 10/2005 |
| WO | WO 2005/100491 A2 | 10/2005 |
| WO | WO 2006/002993 A1 | 1/2006 |
| WO | WO 2006/049863 A1 | 5/2006 |
| WO | WO 2006/060206 A1 | 6/2006 |
| WO | WO 2006/060468 A3 | 6/2006 |
| WO | WO 2007/056404 A1 | 5/2007 |

OTHER PUBLICATIONS

Zhu, H. et al., "Novel Synthesis of Alumina Oxide Nanofibers," Materials Research Society Symposium Proceedings, vol. 703, pp. 25-30, 2002. Abstract Only.

Zhu, H., et al., "g-Alumina Nanofibers Prepared From Aluminum Hydrate with Poly(ethylene oxide) Surfactant," Chemistry of Materials, vol. 14, No. 5, pp. 2086-2093, 2002. Abstract Only.

Wakayama, H., et al., "Nanoporous Metal Oxides Xynthesized by the Nanoscale Casting Process Using Supercritical Fluids," Chemistry of Materials, vol. 13, No. 7, pp. 2392-2396, 2001. Abstract Only.

Yu, Z. et al., "Preparation of Nanometer-sized Alumina Whiskers," Journal of Materails Research, vol. 13, No. 11, pp. 3017-3018, 1998. Abstract Only.

Kimura, Y., et al., "Synthesis of poly[(acyloxy)aloxane] with carboxyl ligand and its utilization for hte processing of alumina fiber," vol. 20, No. 10, pp. 2329-2334, 1987. Abstract Only.

Podergin, V., et al., "Electron-microscopic study of whiskers formed during pentoxide reduction by alunium," Metalloterm, Protsessy Khim. Met., pp. 44-50, 1972. Abstract Only.

Park, B., et al., "Preparation of High-Capacity Ceramic Catalytic Support from Gibbsite," Han'Guk Seramik Hakhoechi, vol. 39, No. 3, pp. 245-251, 2002. Abstract Only.

Brusasco R., et al., "Preparation and Characterization of Fibrillar Boehmite and g-Aluminum Oxide," Materials Research Bulletin, vol. 19, No. 11, pp. 1489-1496, 1984. Abstract Only.

Kuang, X., et al., "Preparation of Special-shaped g-AlOOH g-Al2O3 Ultrafine Powders by Hydrothermal Reaction Method," Materials and Components for Engines, pp. 594-597, 1994, Abstract Only.

Liu, S., et al., "Synthesis of Novel Nanostructured g-Al2O3 by Pyrolysis of Aluminumoxyhdride-HAlO," Journal of Materials Chemistry, vol. 13, No. 12, pp. 3107-3111, 2003. Abstract Only.

Hicks, R., et al., "Nanoparticle Assembly of Mesoporous AlOOH (Boehmite)," Chemistry of Materials, vol. 15, No. 1, pp. 78-82, 2003. Abstract Only.

Ozuna, O., et al., "Pressure Influenced Combustion Synthesis of Gamma- and Alpha-Al2O3 Nanocrystalline," Journal of Physics-Condensed Matter, vol. 16, No. 15, pp. 2585-2591, 2004. Abstract Only.

McHale, J. et al., "Effects of Increased Surface Area and Chemisorbed H2O on hte Relative Stability of Nanocrystalline Gamma-Al2O3 and Al2O3," Journal of Physical Chemistry, vol. 101, No. 4, pp. 603-613, 1997. Abstract Only.

Kuang, D., et al., "Fabrication of Boehmite AlOOH and Gamma-Al2O3 Nanotubes via a Soft Solution Route," Journal of Materials Chemistry, vol. 13, No. 4, pp. 660-662, 2003. Abstract Only.

Tijburg, I., et al., "Sintering of Pseudo-Boehmite And Gamma-Al2O3," Journal of Materials Science, vol. 26, No. 21, pp. 5945-5949, 1991. Abstract Only.

Wei, Z. et al., "Research for Separation of Precursor in the Preparation Process of Gamma-Al2O3 Ultrafine Powder via Precipitation," Journal of Basic Science and Engineering, vol. 12, pp. 19-23, 2004. Abstract Only.

Singhal, A., "Aluminum Speciation in Aqueous Solutions and Its Effect on Properties of Chemically Synthesized Alumina Powders (Ceramics)," Dissertation Abstracts International, vol. 55, No. 04-B, 1994. Abstract Only.

Kim, S., et al., "Preparation of High-Temperature Catalytic Support from Gabbsite II. Properties of Amorphous Alumina as Precursor of Catalyst Support," Journal of the Korean Ceramic Society, vol. 33, No. 1, pp. 92-100, 1996. Abstract Only.

Zhang, Z., et al., "Mesostructured Forms of Gamma-A(sub2)O(sub 3)," J. Am. Chemc. Soc., Vo. 124, No. 8, p. 15, ISSN/ISBN: 00027863. Abstract Only.

Llusar, M. et al., "Templated growth of Alumina-based Fibers Through the Use of Anthracenic Organogelators," Chemistry of Materials, vol. 14, No. 12, pp. 5124-5133, 2002. Abstract Only.

Strek, W., et al., "Preparation and Emission Spectra of Eu(III) in Nanostrcutred Gamma-Alumina," Spectrochimica Acta, Part A, vol. 54A, No. 13, pp. 2121-2124, 1997. Abstract Only.

Yogo, T., et al., "Synthesis of Polycrystalline Alumina Fibre with Aluminium Chelate Precursor," Journal of Materials Science, vol. 26, No. 19, pp. 5292-5296, 1999. Abstract Only.

Saraswati, V., et al., "X-ray Diffraction in Gamma-alumina Whiskers," Journal of Crystal Growth, vol. 83, No. 4, pp. 606-609, 1987. Abstract Only.

Zhu, H., et al., "Growth of Boehmite Nanoribers by Assembling Nanoparticles with Surfactant Micelles," Journal of Physical Chemistry, vol. 108, No. 14, pp. 4245-4247, 2006. Abstract Only.

Kamiya, K. et al., "Crystallization Behavior of Sol-Gel-Derived Alumina Fibers. Formation of .Alpha.-alumina Around 500.DEG.C.," Jinko Kessho Toronkai Koen Yoshishu, vol. 41, pp. 9-10, 1996. Abstract Only.

Lucuta, P., et al., "Phase Evolution in Al2O3 Fibre Prepared From an Oxychloride Precursor," Journal of Materials Science, vol. 27, No. 22, pp. 6053-6061, 1992. Abstract Only.

Thomas J. Martin, Sasol Presentation given on—Functionalized Aluminas, NABALTECH, web page: http://www.nabaltec.de/seiten_d/boehmit_d/anwendungen/news_05_08_98.htm.

Zhu, H. Y., et al., "Growth of Boehmite Nanofibers by Assembling Nanoparticles with Surfactant Micelles", J. Phys. Chem. B., vol. 108, pp. 4245-4247, 2004.

Fisch, H., et al., "Hybrid Materials Based On Polymer Matrices & Organic Components", NTIS, Germany 1994.

Buining et al., J. Am. Ceram. Soc. vol. 74 [6], pp. 1303-1307.

Anonymous: "High Purity Dispersible Aluminas"; URL:http://www.sasol.com/sasol_internet/downloads/DISPERAL-DISPAL_1055338543391.pdf>abstract; tables 1,2.

Boccaccini A. R. et al; "Alumina Ceramics Based on Seeded Boehmite and Electrophoretic Deposition"; Ceramics International; Elsevier; Amsterdam, NL; vol. 28, No. 8; 2002; pp. 893-897.

Grant et al., "Grant and Hackh's Chemical Dictionary", 5th Ed., (1987), McGraw-Hill Book. Co. USA, ISBN 0-07-024067-1, p. 160.

* cited by examiner

BOEHMITE AND POLYMER MATERIALS INCORPORATING SAME

CROSS-REFERENCE TO RELATED APPLICATION(S)

The present application is a continuation application of U.S. patent application Ser. No. 10/414,590, filed Apr. 16, 2003 entitled "Novel Boehmite Particles and Polymer Materials Incorporating Same," naming inventors Hui Tang, Christopher L. Mirley and Ralph Bauer, which claims priority from U.S. Provisional patent application No. 60/374,014, filed Apr. 19, 2002, entitled "Novel Boehmite Particles," naming inventors Ralph Bauer, Christopher L. Mirley and Hui Tang, which applications are both incorporated by reference herein in their entirety.

BACKGROUND OF THE INVENTION

1. Field of the Invention

The present invention concerns particles of boehmite and particularly to boehmite particles that are particularly adapted to use as fillers for thermoplastic resins.

2. Description of the Related Art

Boehmite has long been recognized as a suitable filler for thermoplastic resins in view of the fine particle size and the relative inertness to the polymer in which it is dispersed. It produces good improvements in modulus and thermal behavior and has even been proposed as a flame retardant in U.S. Pat. No. 6,143,816.

The preferred form as recited in a number of U.S. Patents such as U.S. Pat. Nos. 5,360,680 and 5,401,703 is that of fine flakes which were felt to be preferable since earlier fine grained boehmite powders produced by a milling process tended to be globular which is less effective as a filler material. Other methods of making fine boehmite particles caused other problems. For example pyrolysis tends to produce a range of contaminants of the boehmite product and conventional hydrothermal treatments tend to produce tight agglomerates of rhombic prisms which are not easily separated. Refined hydrothermal treatments of aluminum hydroxides such as that of U.S. Pat. No. 5,194,243, (which built on earlier work described in U.S. Pat. Nos. 2,763,620; 2,915,475; 3,385,663; 4,117,105; and 4,344,928), introduced the concept of seeding the conversion of the boehmite pre-cursor using boehmite seeds. This was found to require a high level of seeding to be effective using at least 15% of boehmite seed in order to produce a sub-micron boehmite dispersion with essentially equiaxed particles.

All such efforts produced flaky or equiaxed particles of boehmite which did not readily disperse as individual particles in a polymer unless previously treated with a surface active agent designed to enhance such dispersibility. Typical surface active agents used include amino-silanes which have the capability of bonding to the hydrophilic surfaces of the particles giving them a surface more compatible with the organic polymer in which they were to be dispersed. This avoided the clumping that tended to occur without such a treatment. This tendency becomes greater with decreasing size of the particles because of the increasing surface energy that naturally occurs with diminishing size.

The present invention provides a novel form of boehmite that can be readily dispersed in a thermoplastic polymer at the nano-particle level without the need for any surface treatment and which provide a significantly improved blend of properties by comparison with the prior art boehmite filler materials.

SUMMARY

According to one aspect of the present invention, a modified polymer material is provided, which includes a polymer base and boehmite particles provided in the polymer base, the boehmite particles comprising mainly anisotropically shaped particles having an aspect ratio of at least about 3:1.

According to another aspect of the present invention, a modified polymer material is provided, which includes a polymer base and boehmite particles free of surface agents and being dispersed in the polymer base.

According to another aspect of the present invention, a boehmite material is provided, having mainly boehmite particles having an aspect ratio of at least about 3:1.

According to another aspect of the present invention, a method for forming a product is provided, including providing a modified polymer material having a polymer base and boehmite particles containing mainly anisotropically shaped particles having an aspect ratio of at least about 3:1, and extruding the modified polymer material to form an extruded product, wherein the boehmite particles are dispersed in the extruded product.

DETAILED DESCRIPTION

The present invention provides boehmite particles comprising needle-shaped, (or anisotropic), crystals in which the longest dimension is at least 50 nanometers and preferably from 50 to 2000, and more preferably from 100 to 1000, nanometers; and the dimensions perpendicular to the length are essentially the same and are each less than 50 nanometers; and the aspect ratio, defined as the ratio of the longest dimension to the next largest dimension perpendicular to the length, is at least 3:1, and preferably at least 6:1. These particles will henceforth be described as "needle-shaped" in this description for the sake of clarity.

Unexpectedly the hydrothermal conditions combined with the relatively low seeding level and the acidic pH of the mixture, resulted in preferential growth of the boehmite along one axis such that, the longer the hydrothermal treatment continued, the longer were the needle-shaped boehmite particles that were produced. Remarkably these needle-shaped boehmite particles require no surface treatment to be individually and uniformly dispersed, that is to say to give an essentially uniform distribution within the polymer substantially without forming aggregates, by conventional compounding processes. This uniform and individual dispersion quality is hereinafter called "nano-dispersibility".

The needle-shaped particles according to the invention have a surface area, as measured by the BET technique, of at least 75 m$^2$/g, and preferably from 100 to 300 m$^2$/g.

The invention also includes polymers modified by the incorporation of from 0.5 to 20%, and preferably from 2 to 10%, by volume (based on the combined volume of polymer plus boehmite), of the needle-shaped boehmite particles of the invention. The polymers in which the needle-shaped boehmite particles can be dispersed include for example polyamides, (including for example nylon 6 and nylon 12), thermoplastic polyurethanes, polyalkylene-glycols, ethylene/vinyl alcohol polymers, epoxy resins, acrylate based resins and the like. More generally the polymers are preferably thermoplastic polymers because this takes advantage of the very good dispersibility used in conventional polymer compounding technology using high intensity mixers, extruders and the like. It also recognizes that the use of fillers in the modification of physical properties of a polymer is most frequently an objective in the field of thermoplastic polymers. The products of this invention have the unique property (probably a function of their needle shapes) such that, upon extrusion, the boehmite particles tend to become aligned such that a polymer reinforced by such needle-shaped particles will have considerably enhanced physical properties, such as flex strength, in the direction of extrusion.

It is believed that this unique dispersibility property of the needle-shaped boehmite particles derives from their ability to form hydrogen bonds with polar groups on the polymer chains which favors the mono-dispersed state. The needle-shaped boehmite particles can also be dispersed in other polymers which are essentially non-polar with the addition of conventional dispersing agents such as the amino-silanes.

Because thermosetting resins such as phenolic and acrylate-based resins are also polar in character, it is believed that the needle-shaped boehmite particles can be fully dispersed to the individual particle level in such polymers, if the incorporation is accomplished before the cross-linking stage is significantly advanced for example with the ingredients that form the polymer or at the B-Stage of a condensation resin such as a phenolic resin.

The needle-shaped boehmite particles according to the invention can be prepared by a hydrothermal treatment in which a boehmite precursor is dispersed/suspended in water and heated at a temperature of from 100 to 300 and preferable from 150 to 250° C. in an autoclave at an autogenously generated pressure of from $1 \times 10^5$ to $8.5 \times 10^6$ and preferably from $5 \times 10^5$ to $1.2 \times 10^6$ newtons/m$^2$ for a period of from 1 to 24 and preferably from 1 to 3 hours. The % solids content of boehmite precursor in the dispersion is from 5 to 40, and preferably from 10 to 30%. Along with the boehmite precursor, the dispersion comprises from 2 to 15 and preferably from 5 to 10 wt. %, based on the weight of the precursor, of boehmite particles. The boehmite particles act as seeds around which boehmite generated by conversion of the precursor, can crystallize. Because of the conditions of the hydrothermal treatment and the relatively low level of seeding, these crystals of boehmite grow preferentially along a single axis and to assume needle shapes which remain individually dispersed.

The boehmite precursor can be any aluminum trihydroxide such as bayerite or gibbsite but it can also be finely crushed bauxite. It is also possible to use gamma alumina as the starting material. In the event an impure material such as bauxite is used to produce the needle-shaped boehmite particles it may be desirable, prior to incorporating obtained the boehmite particles obtained into a polymer, to wash them to flush away impurities such as silicon or titanium hydroxides and at least some of the silica content which are the residue of common impurities occurring in natural bauxite ores.

Besides the unexpectedly easy and complete nano-dispersibility in polymers having polar groups, the needle-shaped particles of boehmite are easily dispersed in other polymers after receiving a suitable surface treatment with a surface active agent such as an amino-silane for example A-1100 which is commercially available from Aldrich Chemicals.

Because of the nano-dispersibility of the particles and their very small dimensions, the incorporation of such filler particles has minor or virtually no impact on the transparency of a thin film of the polymer, even at incorporation levels of up to 10 vol %. This can prove a very valuable property in certain circumstances. It also means that thin-wall injection moldings can easily be obtained with points of weakness or surface interruptions—resulting from intrusions of particle agglomerates being largely eliminated.

After the hydrothermal process it is often advantageous to separate any unreacted material and any hard aggregates. This can usually be done by a simple centrifugation process or even by simply decanting the liquid phase containing the peptized boehmite from a precipitated or unreacted phase.

Preparation of the Needle-Shaped Boehmite

EXAMPLE 1

An autoclave was charged with 250 g of CV3002 gibbsite purchased from Alcoa; 25 g of boehmite obtained from SASOL under the name—Catapal B pseudoboehmite; 1000 g of deionized water; and 56 g of 18% nitric acid. The boehmite was pre-dispersed in 100 g of the water and 7 g of the acid before adding to the gibbsite and the remaining water and acid.

The autoclave was heated to 180° C. over a 45 minute period and maintained at that temperature for 2 hours with stirring at 530 rpm. An autogenously generated pressure of about 150 psi was reached and maintained. Thereafter the boehmite dispersion was removed from the autoclave and the liquid content was removed at a temperature of 95° C. The resultant mass was crushed to less than 100 mesh.

Figure 1A:
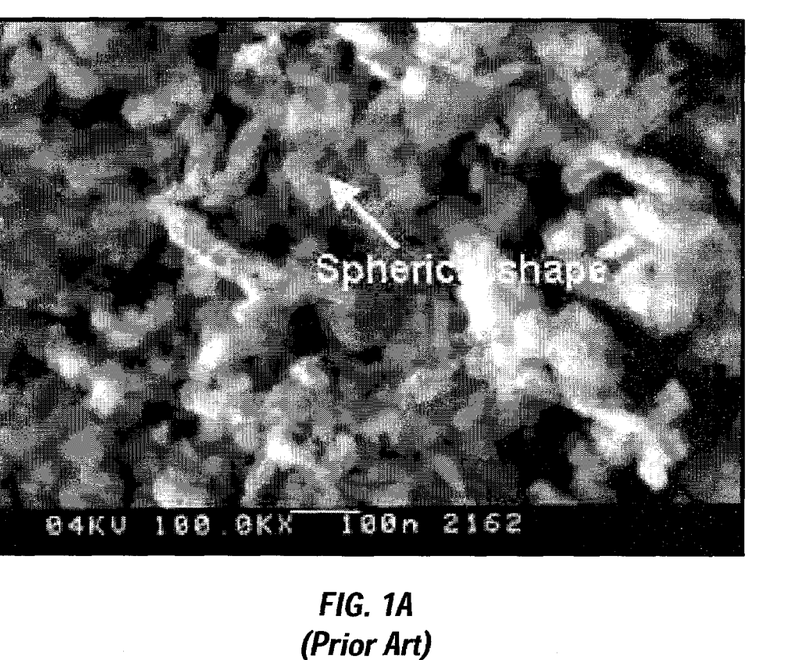
FIGS. 1A and 1B show prior art finely dispersed boehmite particles (FIG. 1A) and needle-shaped boehmite according to the invention (FIG. 1B).
Figure 1B:
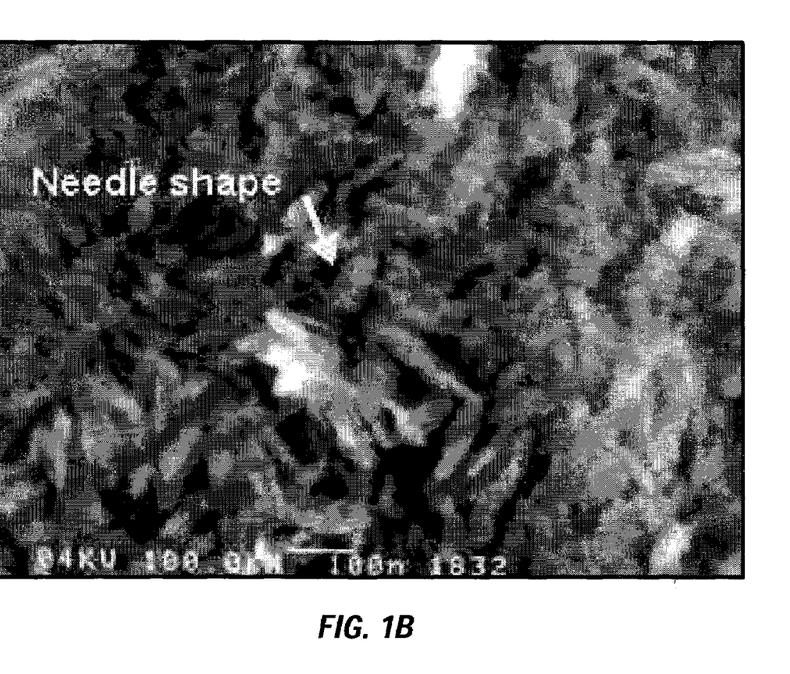

The boehmite obtained was in needle-shaped particles as shown in FIG. 1B. This is shown together with FIG. 1A which illustrates the prior art boehmite as represented by C-200 boehmite from SASOL. It will be noted that C-200, in common with most commercial boehmite powders, has particles that are predominantly equiaxed, (equal dimensions in the three mutually perpendicular directions), except for some obvious agglomerates. Needle-shaped crystals are rare. By contrast the particles of the invention are essentially all individual and needle-shaped, about 10-20 nanometers in diameter and about 100-200 nanometers in length.

EXAMPLE 2

This example illustrates the technique used to blend the boehmite of the invention with nylon 6 and the properties of the products obtained at two different levels of incorporation of boehmite in comparison with the unmodified polymer.

Granulated Nylon 6 was dried overnight night at 80° C. and then mixed with the specified amount of filler. The mixture was then passed through a Werner & Pfleiderer ZSK-30 twin-screw vented extruder. The extruder barrel was maintained at 235-245° C. and the screw speed was maintained at 300 rpm. The extruded material was cooled and pelletized and dried at 80° C.

Test samples were then injection molded from the pelletized material using an extrusion barrel temperature of 250-270° C. and a mold maintained at 70-90° C.

Figure 2A:
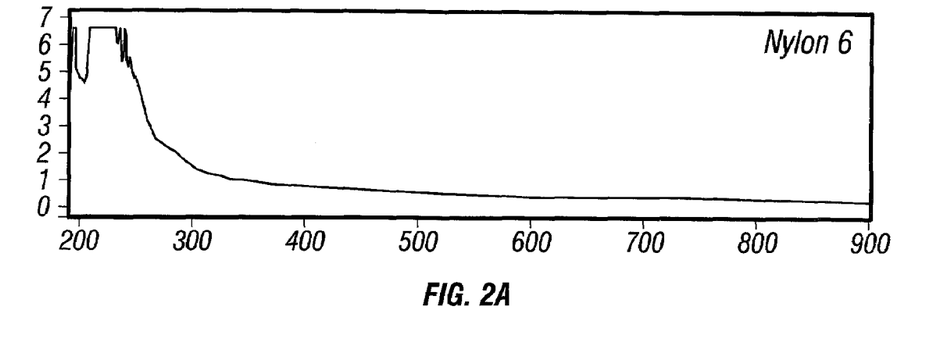
FIGS. 2A, 2B and 2C show the UV-visible Spectra of: Nylon 6 alone and with two different levels of boehmite incorporation.
Figure 2B:
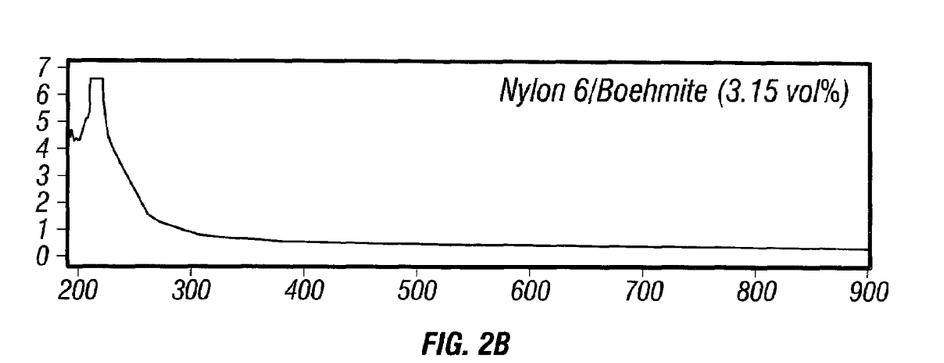
Figure 2C:
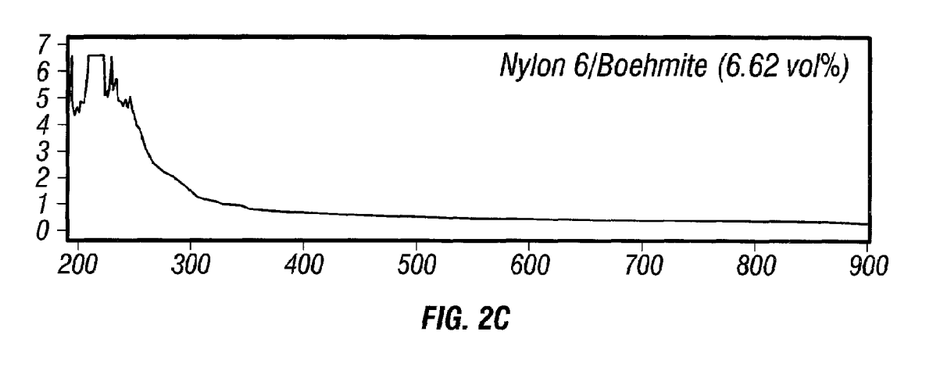
Figure 3A:
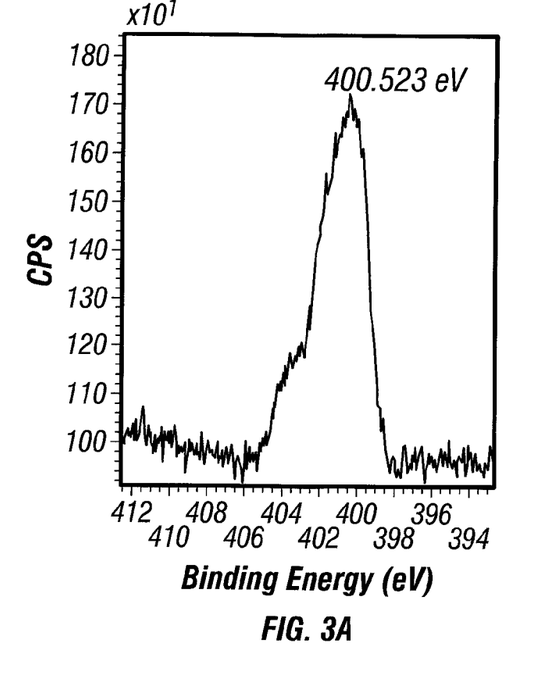
FIG. 3A, 3B and 3C) are Fourier Transform IR spectra of the three formulations for which the UV spectra are given in FIGS. 2A, 2B, and 2C.
Figure 3B:
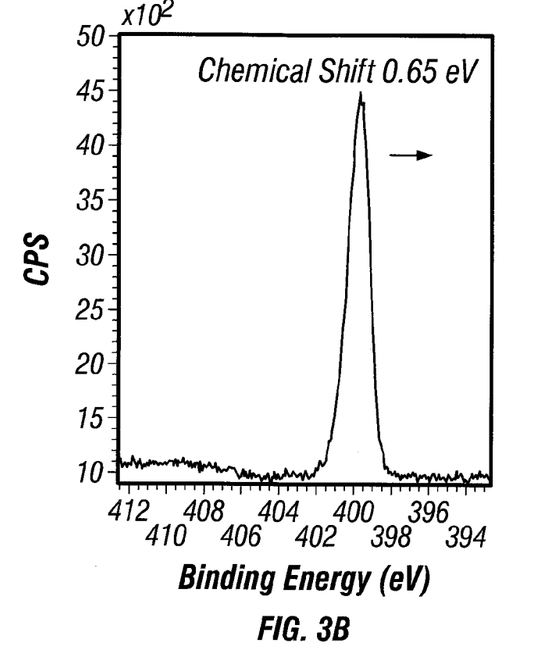
Figure 3C:
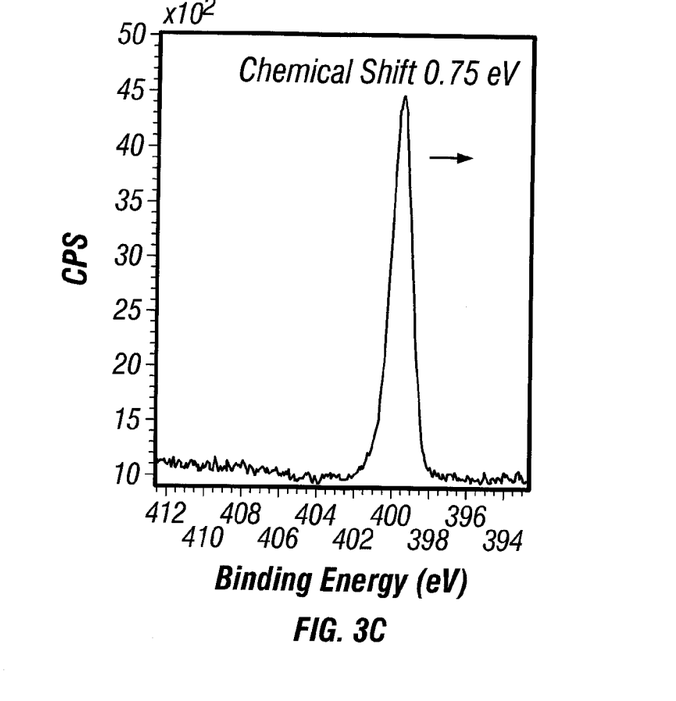

Three samples were made in this way: one with no filler; one with 3.15 vol % of the needle-shaped boehmite of the invention; and one with 6.62 vol % of the same boehmite. FIGS. 2A, 2B, 2C, 3A, 3B, 3C, and 4 show the UV-VIS Spectra, the FTIR spectra and the XPS, N 1 s spectra of these three samples. A Comparison of FIG. 2A with FIGS. 2B and 2C show that the nano-composite has essentially no absorption in the 400 to 700 nanometers wavelength range which corresponds to most of the visible/UV wavelength range. A comparison of FIG. 3A with FIGS. 3B and 3C shows the effect of the boehmite on the light transmittance through a thin film of the sample. The purpose is to show the characteristic shift of the minimum encountered around 3060 cm$^{-1}$ with increasing boehmite content. This is known to relate to hydrogen bond formation and indicates clearly that hydrogen bonding between the nylon and the boehmite is at least one of the mechanisms by which the nano-dispersion of boehmite in the nylon is promoted.

Figure 4:
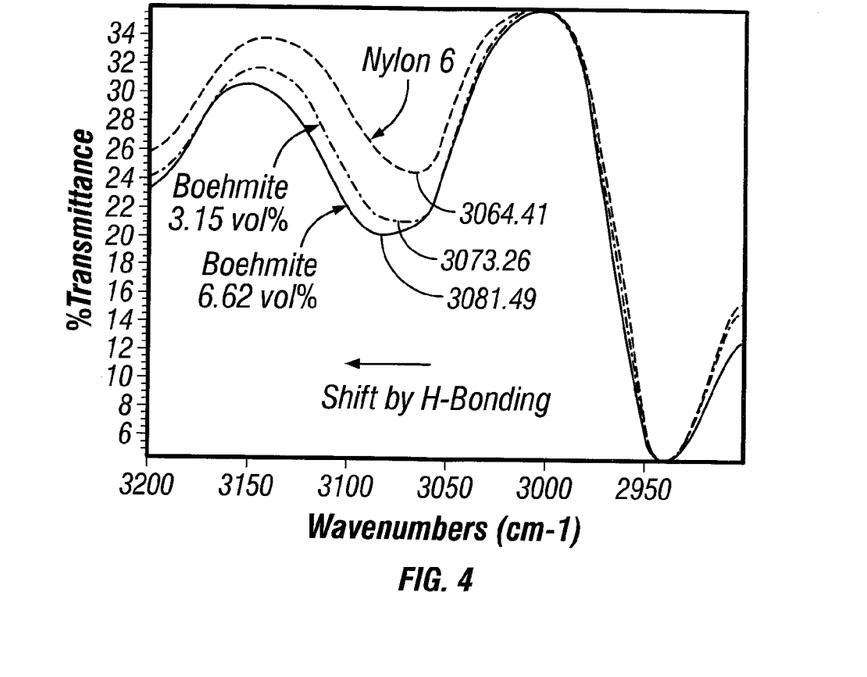
FIG. 4 shows the corresponding N 1 s spectra for the same three formulations.

FIG. 4 shows the same phenomenon by means of the shift of the N 1 s binding energy peak at about 400 eV with increasing boehmite content.

Figure 5:
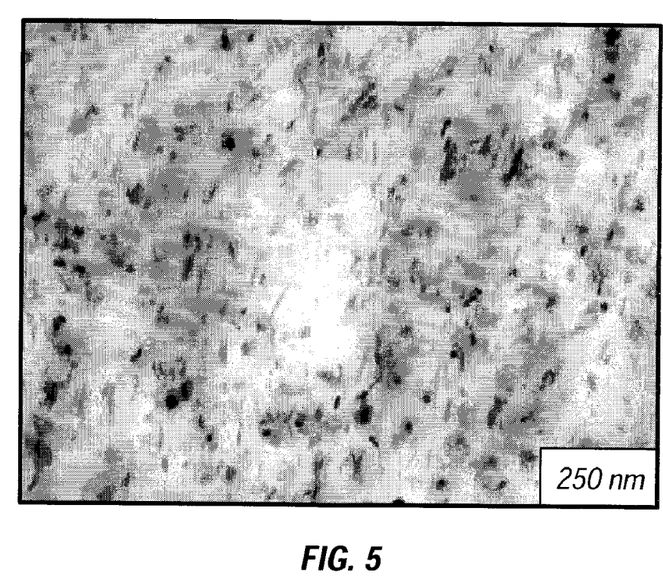
FIG. 5 shows a high magnification transmission electron micrograph of Nylon 6 with 6.62 vol % of boehmite.

FIG. 5 shows an exfoliated surface of the product containing 6.62 vol % of the boehmite particles. The image was taken using transmission electron microscopy at a magnification of ×51K. From the image it can be clearly seen that the separate needle-shaped boehmite particles are uniformly and individually dispersed in the polymer with no agglomeration.

EXAMPLE 3

Figure 6A:
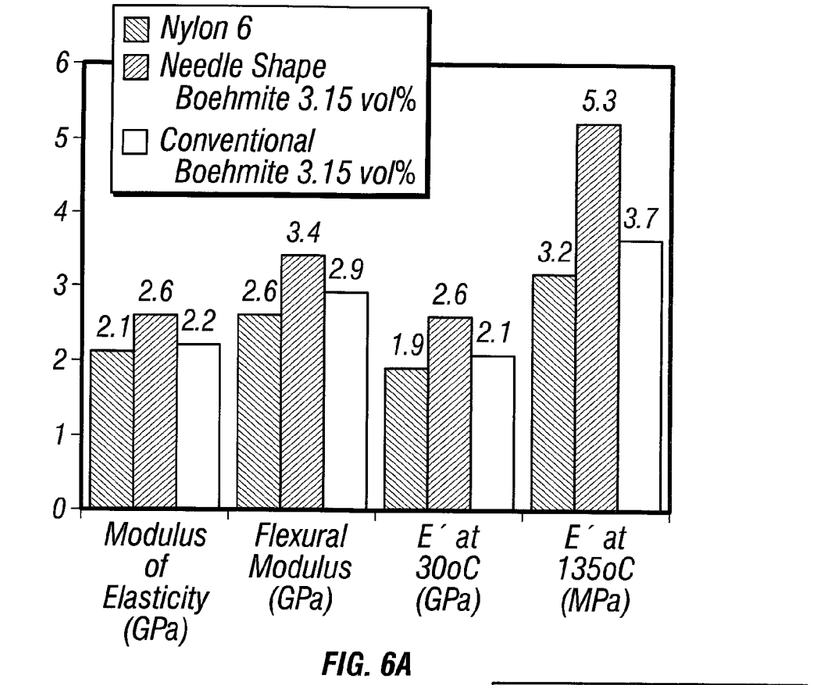
FIGS. 6A and 6B show bar graphs for different physical properties relating to nylon 6 alone, with 3.15 vol % of conventional boehmite and with 3.15 vol % of the needle-shaped boehmite of the invention.
Figure 6B:
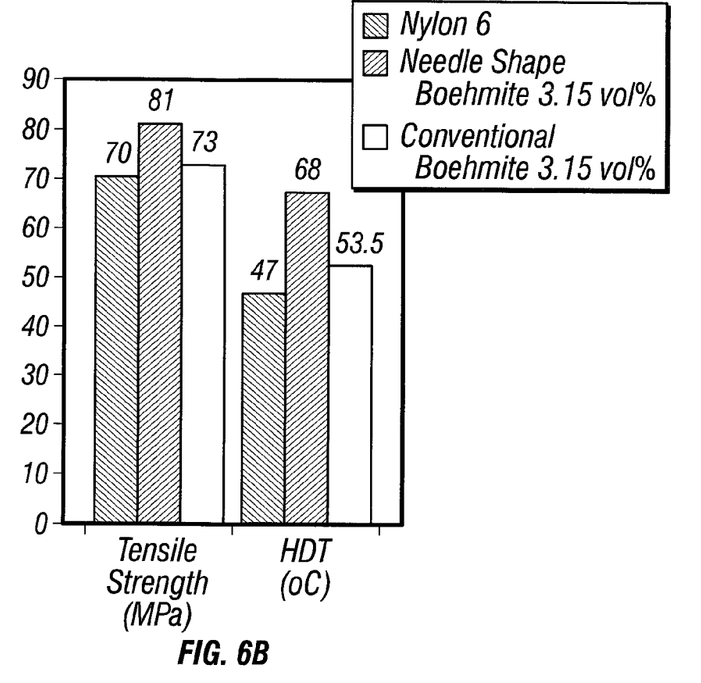

In this Example the effect of incorporating a conventional boehmite, exemplified by C-200 available from SASOL, which has particles as shown in FIG. 1A with a similar amount of the boehmite according to the invention, which has particles as shown in FIG. 1B. In each case the samples evaluated were compounded as described in Example 2. The modulus of elasticity, flexural modulus, E' (storage modulus from DMA measurements) at 30° C. and 135° C., tensile strength, and heat distortion temperature were measured for the unmodified nylon 6, and the same polymer with conventional boehmite and then with the boehmite according to the invention were measured. The results are presented in the bar graphs shown in FIGS. 6A and 6B. From these graphs it can be clearly seen that the needle-shaped boehmite outperforms the conventional boehmite and often by considerable amounts.

EXAMPLE 4

Figure 8:
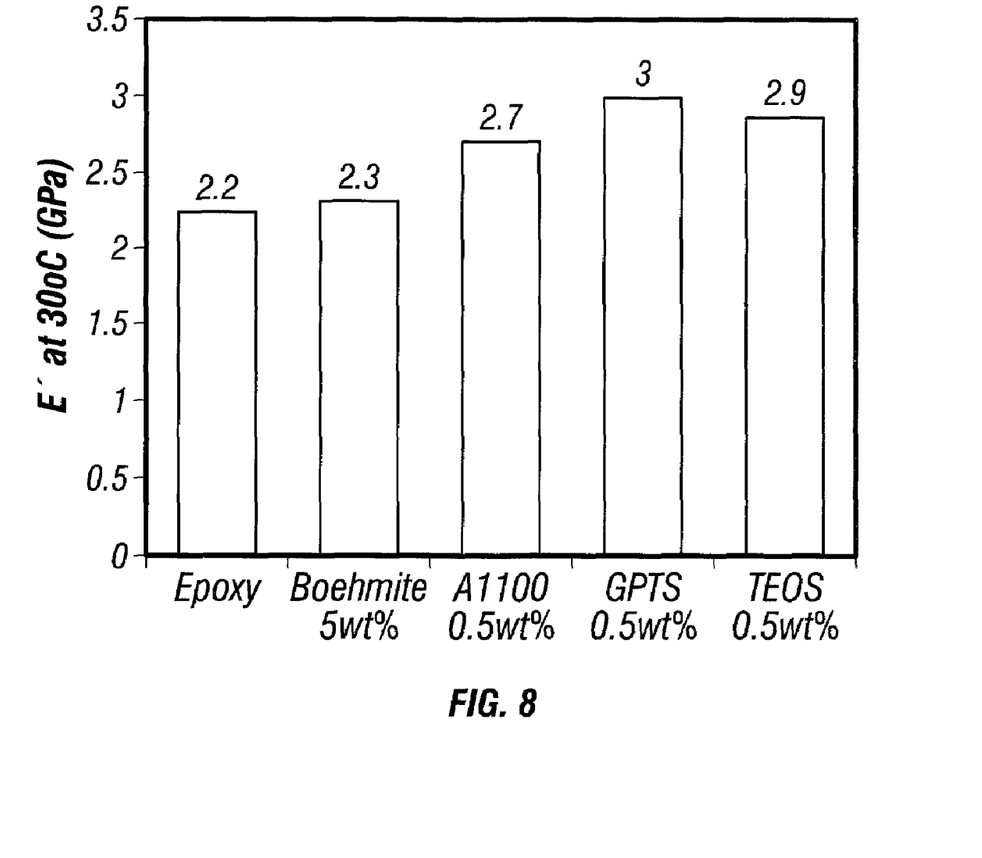
FIG. 8 is a bar graph showing the effect of amino-silane additives in improving the storage modulus of an epoxy resin having 5 vol % of needle-shaped boehmite particles dispersed therein.

In this Example the boehmite according to the invention was dispersed in an epoxy resin. The resin selected was Buehler's Epo-Kwik with its companion hardener. The boehmite used in previous examples was mixed with the resin component until homogeneous and separated into four samples. To three of the samples different surface active agents were added in an amount that was 0.5% of the weight of the boehmite in the formulation. The agents were tetraethoxysilane (TEOS); gamma-glycidoxypropyltrimethoxysilane (GPTS); and 3-aminopropyltriethoxysilane (A-1100). The fourth sample was contained no additive. The mixtures were stirred overnight on a hotplate with the temperature set between 40 and 85° C. Each mixture was then given four ultrasonic probe treatments each lasting 2.5 to 3 minutes with cooling in between each treatment in an ice bath. The samples were then placed in aluminum pans and placed under a vacuum for 20 minutes to remove air. The hardener component of the epoxy resin was then added in an amount that was one fifth of the amount of resin and the mixture was carefully stirred and then allowed to cure overnight at room temperature. Cure was completed at 100° C. at setting #4 for three hours The cured sample was then tested to evaluate its storage modulus and the results are shown in the bar-graph presented as FIG. 8 with the unmodified epoxy resin value given for the sake of comparison. As can be seen from the bar graph, the boehmite alone does not produce a great improvement but after addition of the surface active agent, the storage is raised by as much as a third.

EXAMPLE 5

This example shows the effect of incorporating the boehmite of the invention in a thermoplastic polyurethane with was ISOPLAST 301 supplied by Dow Chemical Company under that trademark.

Figure 7:
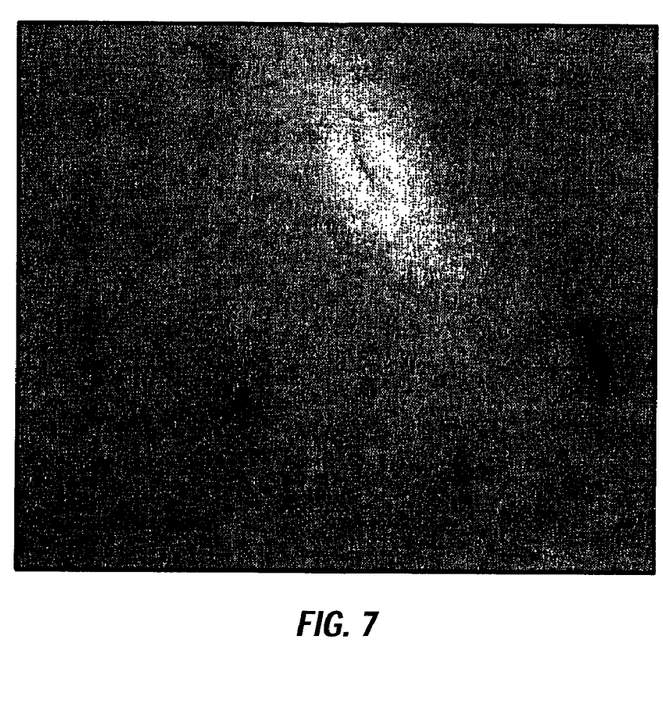
FIG. 7 shows a high magnification transmission electron micrograph of a thermoplastic polyurethane (Isoplast 301 sold by Dow Chemical Company), with 1.86 vol % of boehmite.

The polymer was first dried at 100° C. and the needle-shaped boehmite particles prepared according to Example 1 were dried at 50° C., in each case overnight. The boehmite (1.86 vol %) and the polymer were then mixed using the equipment described in Example 2 and the extrudate was cooled and pelletized. The blended pellets were then dried at 80° C. and injection molded into samples for evaluation. A transmission electron micrograph showing the complete dispersal of the boehmite particles is shown at FIG. 7.

What is claimed is:

1. A method of forming boehmite particulate material, comprising:
   providing boehmite precursor and boehmite seeds in water to form an aqueous suspension; and
   hydrothermally treating the aqueous suspension to convert the boehmite precursor into boehmite particles having a needle-shaped morphology, an aspect ratio of at least 3:1, wherein aspect ratio is the ratio of longest dimension to next largest dimension at least 3:1, and a particle size within a range of 50 to 2000 nm, wherein the boehmite seeds provide a nucleation site for the growth of the boehmite particles.

2. The method of claim 1, wherein the boehmite particles have an aspect ratio of at least 6:1.

3. The method of claim 1, wherein the boehmite particles have a particle size within a range of 100 to 1000 nm.

4. The method of claim 1, wherein the suspension contains 5 to 40wt % of boehmite precursor.

5. The method of claim 4, wherein the suspension contains 10 to 30 wt % of boehmite precursor.

6. The method of claim 1, wherein the suspension contains 2 to 15 wt % boehmite seeds, based on the weight of the boebruite precursor.

7. The method of claim 6, wherein the suspension contains 5 to 10 wt % boehmite seeds, based on the weight of the boehmite precursor.

8. The method of claim 1, wherein hydrothermal treatment is carried out at a temperature within a range of 100 to 300° C.

9. The method of claim 8, wherein hydrothermal treatment is carried out at a temperature within a range of 150 to 250° C.

10. The method of claim 1, wherein hydrothermal treatment is carried out under autogenous conditions.

11. The method of claim 1, wherein hydrothermal treatment is carried out under a pressure of about $1 \times 10^5$ to $8.5 \times 10^6$ $N/m^2$.

12. The method of claim 11, wherein hydrothermal treatment is carried out under a pressure of about $5 \times 10^5$ to $1.2 \times 10^6$ $N/m^2$.

13. The method of claim 1, wherein hydrothermal treatment is carried out in an acidic pH.

14. The method of claim 1, wherein the boehmite particles have a surface area greater than about 75 $m^2/g$.

15. The method of claim 14, wherein the boehmite particles have a surface area greater than about 100 $m^2/g$.

16. The method of claim 15, wherein the boelimite particles have a surface area within a range of about 100 $m^2/g$ to 300 $m^2/g$.

17. The method of claim 1, wherein the boehmite particles are nano-dispersable.

* * * * *